US005881258A

United States Patent [19]
Arya

[11] Patent Number: 5,881,258
[45] Date of Patent: Mar. 9, 1999

[54] HARDWARE COMPATIBILITY CIRCUIT FOR A NEW PROCESSOR ARCHITECTURE

[75] Inventor: Siamak Arya, Palo Alto, Calif.

[73] Assignee: Sun Microsystems, Inc., Palo Alto, Calif.

[21] Appl. No.: 829,632

[22] Filed: Mar. 31, 1997

[51] Int. Cl.$^6$ ........................................................ G06F 9/00
[52] U.S. Cl. ........................................................... 395/385
[58] Field of Search ........................ 364/DIG. 1 MS File, 364/DIG. 2 MS File; 395/376, 385, 380, 381, 383, 384, 118, 123, 125, 126

[56] References Cited

U.S. PATENT DOCUMENTS 5,568,646  10/1996  Jaggar ........................................ 395/385

OTHER PUBLICATIONS

Siamak Arya, "A Mechanism For Hardware Compatibility For A New Architecture", Advanced Development Group, SPARC Technology Business, Sun Microsystems, Inc., pp. 1–5.

*Primary Examiner*—Robert B. Harrell
*Attorney, Agent, or Firm*—Skjerven, Morrill, MacPherson, Franklin & Friel L.L.P.; Stephen A. Terrile

[57] ABSTRACT

A processor which includes separate instruction and data caches and which executes instructions according to a new instruction set architecture, efficiently executes old software code by providing the processor with a compatibility circuit which receives old software code instructions from a secondary memory, groups these instructions according the new instruction set architecture and provides these grouped instructions to the instruction cache of the processor. In this processor, the old instruction software code conforms to an old instruction set which is a subset of the new instruction set.

21 Claims, 6 Drawing Sheets

HARDWARE COMPATIBILITY CIRCUIT FOR A NEW PROCESSOR ARCHITECTURE

CROSS-REFERENCE TO RELATED APPLICATION

The present application is related to the application entitled Processor Architecture Including Grouping Circuit, having an attorney docket number of M-4430 filed on even date herewith.

BACKGROUND OF THE INVENTION

Architectures which provide high instruction level parallelism (ILP) are known. Such an architecture may be achieved by removing or reducing data flow and control flow constraints. Data flow constraints which are not inherent in original code arise from lack of sufficient resources for initiation and execution of multiple instructions concurrently. Control flow problems are caused by branches which force unpredictable changes in the sequential order of code execution. Removing these obstacles allows for the formation of larger basic blocks of instructions, thereby resulting in higher instruction level parallelism. The data flow problems are reduced by increasing the number of functional units, registers, condition bits, by pipelining the functional units and using nonblocking caches. The control flow problem is reduced by using techniques such as conditional execution, speculative execution and software pipelining, thereby leveraging hardware support. Accordingly, for high instruction level parallelism, the processor architecture includes a closely tied hardware and compiler architectures. Such an architecture is discussed in *An Architecture for High Instruction Level Parallelism,* Proceeding of the 28th Annual Hawaii International Conference on System Sciences, Arya et al, *1995,* p 153, which is hereby incorporated by reference in its entirety.

The success of a microprocessor architecture is highly dependent on the software applications that run on that processor architecture. With thousands of applications running on a particular processor architecture, it is difficult to design a new architecture with a new instruction set architecture (ISA) and expect every software vendor to port its software to the new design. The inability to change the instruction set architecture also forces the processor to improve with the speed of the improvements in the process technology. Therefore, it is desirable to design an architecture with a new ISA and new features such as conditional and speculative execution as well as perhaps a large number of registers, while still being able to execute old software. The old software should also run with competitive performance on the new machine. The technique is also applied to architectures in which the instruction scheduling is done in software and instruction grouping information is coded into each instruction. Similarly, this technique can be applied to superscalar machines to remove the grouping logic from the pipeline to allow for higher issue bandwidths than are possible with superscalar architectures.

SUMMARY OF THE INVENTION

It has been discovered that a processor which includes separate instruction and data caches and which executes instructions according to a new instruction set architecture may efficiently execute old software code by providing the processor with a compatibility circuit which receives old software code instructions from a secondary memory, groups these instructions according the new instruction set architecture and provides these grouped instructions to the instruction cache of the processor. In this processor, the old instruction software code conforms to an old instruction set which is a subset of the new instruction set.

In a preferred embodiment, the invention relates to a system for executing a first instruction set corresponding to a first machine architecture on a processor executing a second instruction set corresponding to a second machine architecture. The system includes memory storing instructions corresponding to the first instruction set; a compatibility circuit and a processor. The compatibility circuit maps the instructions corresponding to the first instruction set to respective instructions corresponding to the second instruction set. The processor includes an instruction cache, a data cache and a processing portion, the instruction corresponding to the second instruction set being loaded into the instruction cache on a line by line basis.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
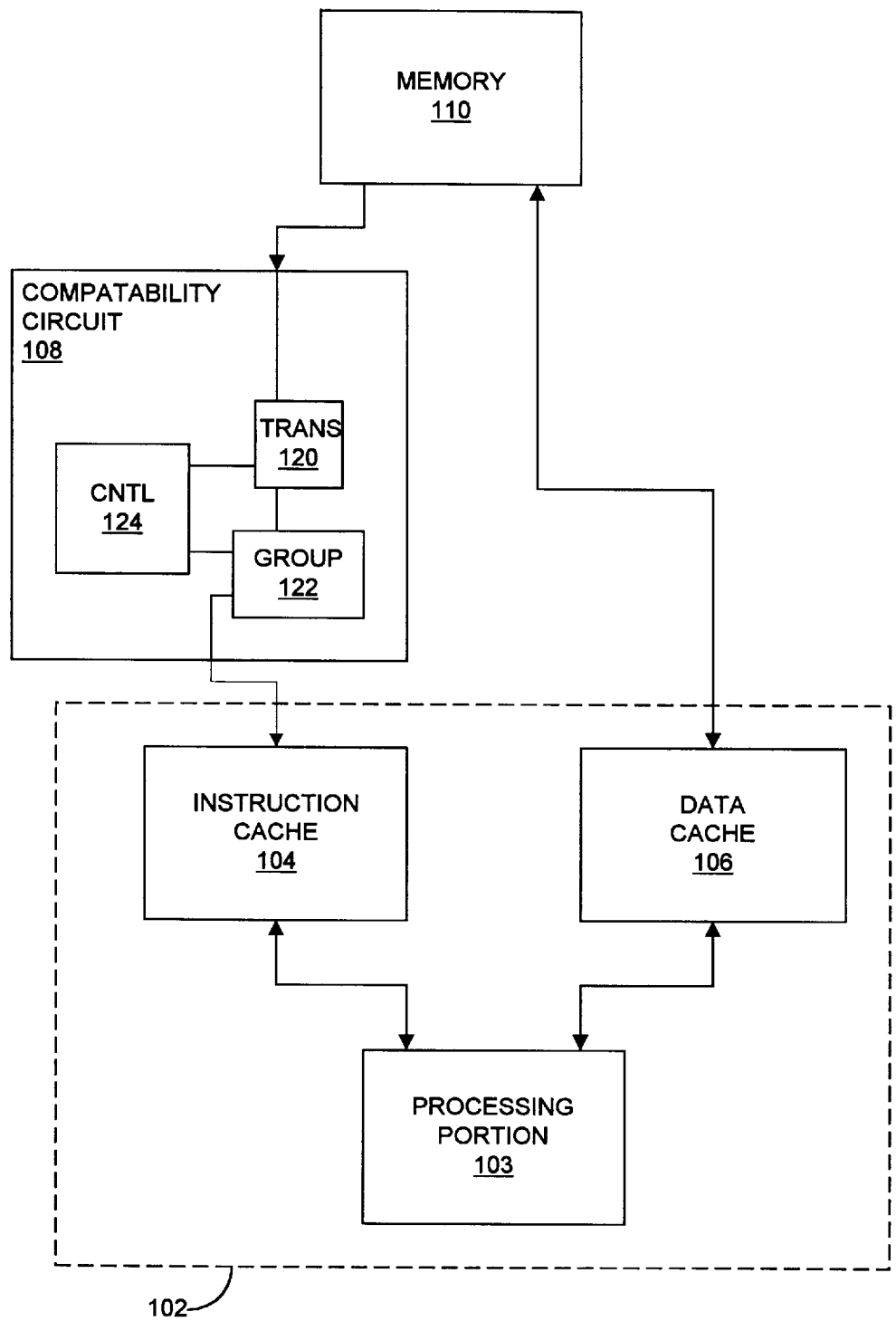
FIG. 1 shows a block diagram of a processor system which includes a hardware compatibility circuit in accordance with the present invention.

Referring to FIG. 1, processor system 100 includes new machine architecture processor 102 which includes processing portion 103, instruction cache 104 and data cache 106. Instruction cache 104 and data cache 106 are coupled to processor 103. Processor system 100 also includes compatibility circuit 108 which is coupled between instruction cache 104 and memory 110. Memory 110 may be either an external memory or a secondary cache which is in turn coupled to an external memory. Compatibility circuit 108 includes translation circuit 120, which translates old machine instructions to new machine instructions, and grouper circuit 122, which groups instructions based upon instruction type.

In operation, there is a one to one mapping of old machine instructions to new machine instructions. By providing a one to one mapping, the transformation of old machine instructions to new machine instructions is dramatically simplified. Also, because there is a one to one mapping, the transformation is performed using hardware. The transformation from the old machine instructions to the new machine instructions is done on a cache line basis. If a one to one mapping of instructions were not used, address changes would have to be handled via cache structures.

New machine architecture processor 102 functions with instructions which are 64-bits long and contain an identifier for group identification and an identifier for instruction functionality identification. Thus, instructions within the new instruction architecture may be grouped as superscalar instructions in advance of instruction pipeline. Instruction cache fetch is the start of the instruction pipeline. Also, because instruction functionality is identified during translation, no decoding of instructions is needed to identify the functionality of the instruction for resource allocation.

Instruction translation and grouping are performed when a cache line is transferred from the memory 110 to instruction cache 104 of new machine processor 102. When a miss from the processor instruction cache 104 occurs, the missing cache line is either found in the secondary cache or from the external memory. The new line is provided to the instruction cache 104 via compatibility circuit 108. The compatibility circuit 108 takes an instruction which conforms to an old machine format and translates, maps and groups the instructions format to conform to the format of the instructions of the new machine. Instructions that are grouped together are marked using one or more bits of each new machine instruction. Additionally, any other changes to the instruction are also performed by the compatibility circuit 108. These other changes may include identifying the functional unit of the processing portion 103, or the pipeline in which the instruction should be issued as well as marking the function identifier and resolving delayed branch instruction problems.

After the mapping and grouping is complete, the new extended cache line is transferred to instruction cache 104. By translating before the instruction is transferred to instruction cache 104, the instruction translation occurs outside of any critical timing path. Additionally, because the translation is after the secondary cache, usage of the secondary cache is increased; instructions may be 32 bits wide in the secondary cache and 64 bits wide in the instruction cache. Additionally, because memory 110 may hold both data and instructions, addressing problems could occur if old machine instructions were converted to new machine instructions prior to loading the instructions into memory 110. By performing the translation when a load is performed to instruction cache 104, these addressing problems are avoided.

Figure 2:
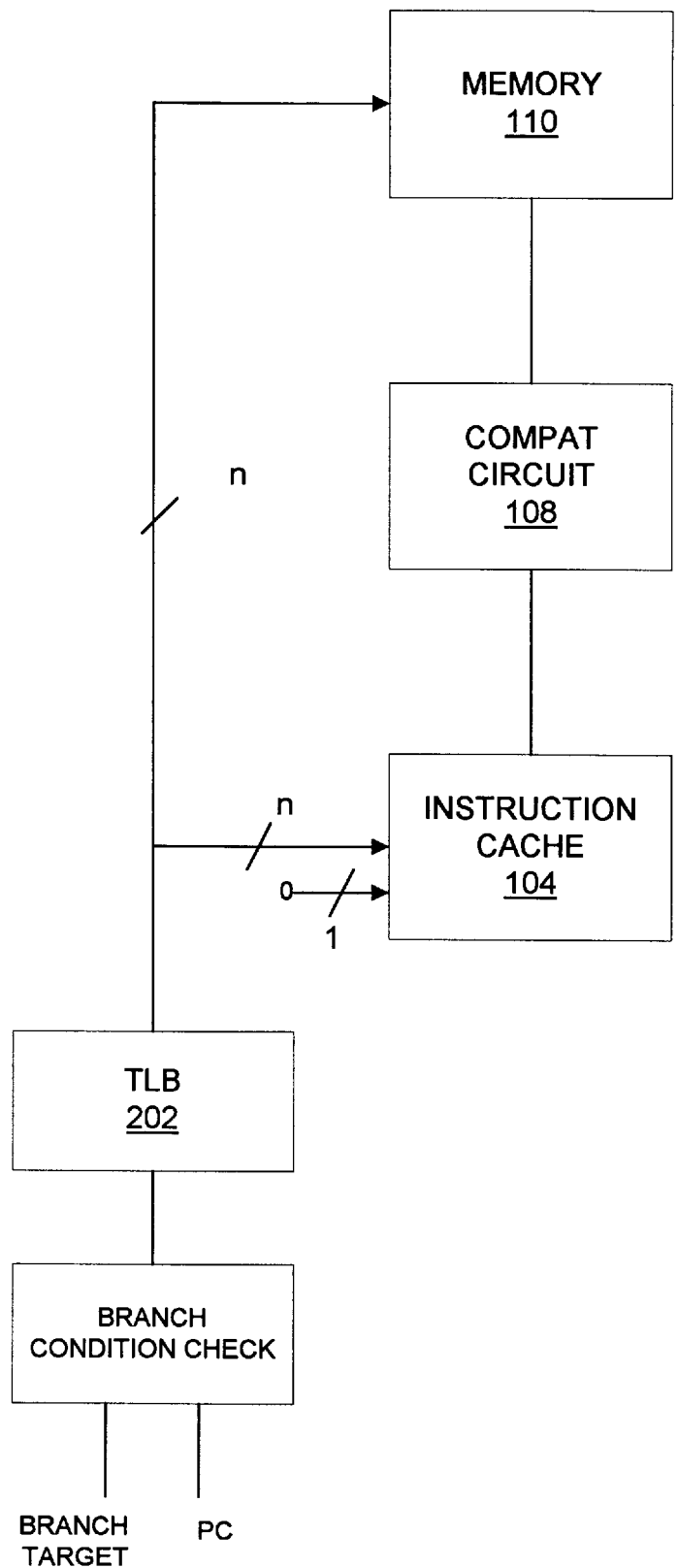
FIG. 2 shows a block diagram of the cache addressing scheme of the hardware compatibility mechanism of the processor of FIG. 1.

Referring to FIG. 2, translating 32-bit old machine instructions to 64-bit new machine instructions causes the instruction addresses to change. Because compatibility circuit 108 translates a cache line at a time, branch target addresses can not be modified to reflect the new address. Accordingly, a hardware addressing procedure is performed. Because, compatibility circuit 108 translates instructions from 32-bits to 64-bits, every instruction address becomes twice its original address. Thus, instruction addresses are the original address shifted left by one bit. Accordingly, when fetching the translated new machine instructions from cache 104, a zero is added as the least significant bit of the binary address. This procedure does not require any changes to the original addresses with the code.

More specifically, cache lines within cache 104 are twice as wide as those within memory 110. Two caching schemes are used when the system is operating in a native mode of operation or in a mapped mode of operation. In a native mode of operation of processor 100, i.e., 64-bit new machine instruction to 64-bit new machine instruction, the cache lines are transferred from memory 110 to instruction cache 104 and half of the cache line is not used. In a mapped mode of operation, the 32-bit old machine instructions are mapped into 64-bit new machine instructions and thus a line from memory 110 fills the entire instruction cache line. In this case, all of the address tagging and translation to the instruction cache are performed the same for both modes of operation, with the exception that the mapped mode concatenates a least significant bit of zero to addresses that are accessing instruction cache 104.

In native mode, a secondary cache line is transferred to the instruction cache. For ease of understanding, the native mode is discussed setting forth a cache line to cache line transfer; however, this does not preclude more complex cache transfers such as a superblock cache transfers. In mapped mode, secondary cache lines are superblocks for the instruction cache lines with two blocks per line. In this case, full cache capacity is used in both modes of operation. When the instruction cache is missed and is hit in the secondary cache, one half of the secondary cache line is translated and is transferred to the instruction cache. The cache strategy is implementation independent. This strategy could allow for two consecutive lines of the instruction cache to be filled for each instruction cache miss, or could allow for a prefetch mechanism to determine which instruction cache lines to fill. The addressing in this mode requires that a zero bit be concatenated to the least significant bit of the address after address translation and before addressing the instruction cache. The physical address, or the virtual address if the cache is a virtual cache, is doubled, thereby causing one line of the secondary cache to be mapped to two lines in the instruction cache. The address provided to the secondary cache is the original instruction address.

Figure 3A:
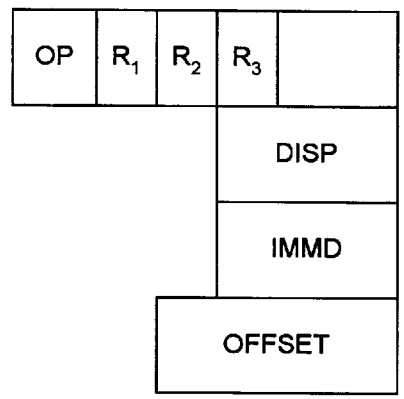
FIGS. 3A and 3B show a block diagram representing examples of the sample instruction fields which operate with the processor of FIG. 1.

Referring to FIG. 3A, instructions which conform to the old machine architecture are 32-bit instructions. Within the 32-bits, the instruction includes a 7-bit op code field and a 5-bit first operand register location field (R1). The contents of the remainder of the instruction depends on the op code. For example for a register to register instruction, the instruction would include two 5-bit operand register location (R1, R2) fields and a 5-bit destination register location (R3) field. For a load instruction, the instruction would also include a 5-bit operand register location (R2) field as well as a 15-bit displacement field (DISP). For an immediate instruction, the instruction also includes a 5-bit operand register location field as well as a 15 bit immediate field (IMMD). For a branch instruction, the instruction also includes a 20-bit offset field (OFFSET).

Figure 3B:
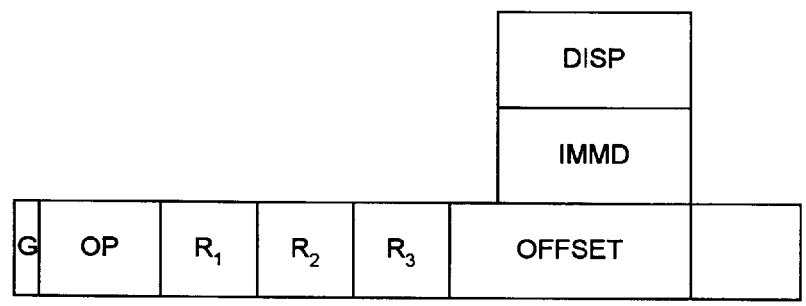

Referring to FIG. 3B, instructions which conform to the new machine architecture are 64-bit instructions. Within the 64 bits, the instruction includes a 1 bit grouping field, a 10-bit op code field (OP), an 8-bit first register field (R1), an 8-bit second register field (R2), an 8-bit third register field (R3) and a 20-bit offset field. The instruction also includes 9 bits which are reserved for future use.

Figure 4:
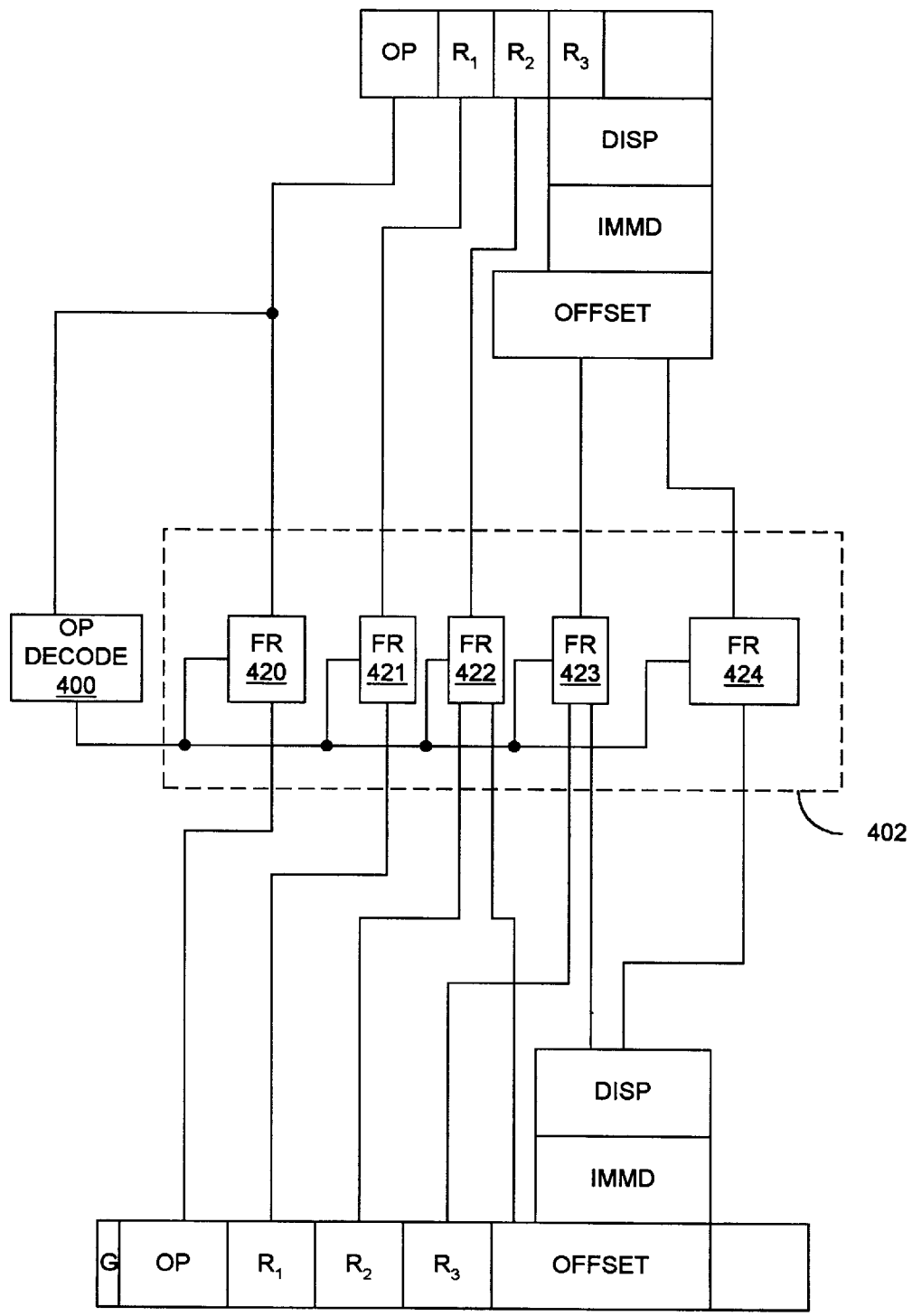
FIG. 4 shows a block diagram of a translator of the processor of FIG. 1.

Referring to FIG. 4, translation circuit 120 includes operation decode circuit 400 as well as instruction translation circuit 402. Instruction translation circuit 402 includes a plurality of field translation circuits 420–424, each of which receives an old machine instruction field, or portion thereof, as an input and provides a new machine field, or portion thereof, as an output. Operation decode circuit 400 also receives the op code field of the old machine instruction as an input.

In operation, when control circuit 124 (See FIG. 1) determines that compatibility circuit 108 is receiving an old machine instruction that requires translation, control circuit 124 directs the old machine instruction to translation circuit 120. When translation circuit receives the old machine instruction, operation decode circuit 400 analyzes the op code field of the old machine instruction to determine the old machine instruction type. Based upon the old machine instruction type, operation decode circuit 400 controls translation circuit 402 to translate the old machine instruction to a new machine instruction.

More specifically, field translation circuit 420 translates the 8-bit old machine instruction to a 10-bit new machine instruction. Field translation circuit 421 translates the 5-bit old machine register field to an 8-bit new machine register field. Field translation circuit 422 translates the next 5-bits of the old machine instruction based upon the old machine instruction operation. For example, if the instruction is a register to register instruction, then field translation circuit 422 translates the 5-bit register field to an 8-bit register field. If the instruction is a branch instruction, then field translation circuit 422 translates the 5-bit field as a 5-bit portion of the 20-bit offset field of the new machine instruction. Field instruction circuit 423 translate the next 5-bits of the old machine instruction based upon the old machine instruction type. If the instruction is a load operation, then field translation circuit 423 translates the next 5-bits as a 5-bit portion of the 20-bit displacement field of the new machine instruction. If the instruction is a branch operation, then field translation circuit 423 translates the next 5-bits of the old machine instruction as 5 bits of the offset field of the new machine instruction. Field instruction circuit 424 translates the next 10 bits based upon the old machine instruction operation. For example, if the old machine instruction is a register to register operation, then there is no information in this field and no translation is necessary. If the old machine instruction is a load operation, an immediate operation or a branch operation, then field translation circuit 424 translates the 10 bits of the old machine instruction to 10 bits of the new machine instruction.

Figure 5:
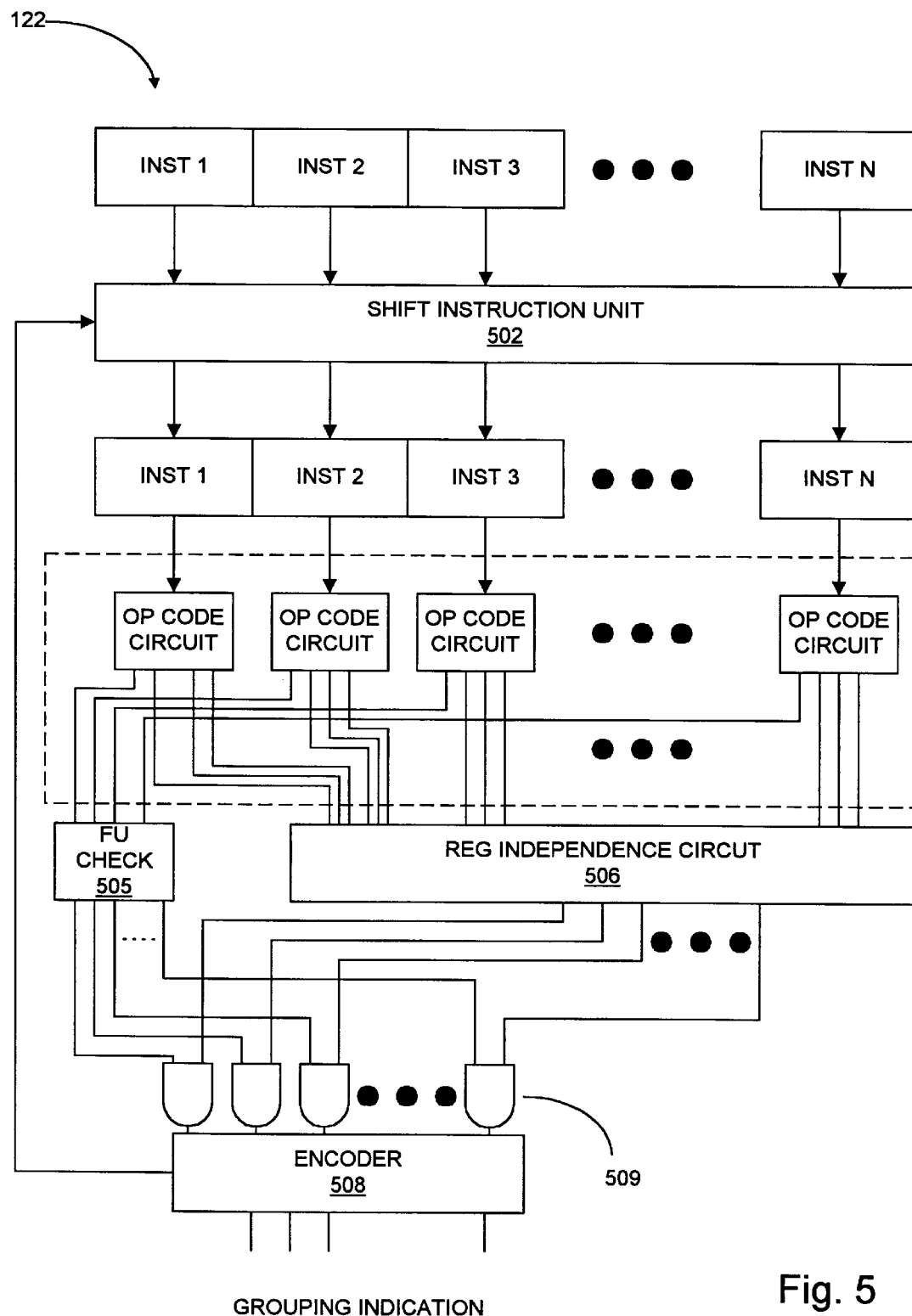
FIG. 5 shows a schematic block diagram of a mapper of the processor of FIG. 1.

Referring to FIG. 5, grouper circuit 122 includes shift instruction unit 502 which is coupled to op code circuit 504. Op code circuit 504 is in turn coupled to functional unit check circuit 505 and register independence circuit 506 which are coupled to encoder 508 via AND circuit 509. Encoder 508 is also coupled to shift instruction unit 502. Op code circuit 504 includes a plurality if instruction specific op code circuits 510 which correspond to respective instructions received from shift instruction unit 502. AND circuit 509 includes a plurality of AND gates 512, the number of which correspond to the number of instructions within the instruction set.

In operation, when an instruction set is received by grouper circuit 122, shift instruction unit passes the instruction set to op code circuit 504. The instruction specific op code circuits 510 within op code circuit 504 analyze respective instructions to indicate to which functional unit each op code within an instruction set is to be issued. The functional unit information is then provided to functional unit check circuit 505.

Op code circuit 504 also retrieves from the instruction any register locations that are to be used when executing the instruction. These register locations are provided to register test circuit 508. Functional unit check circuit 505 analyzes the functional units from each instruction within the instruction set to determine which instructions within the instruction set can be issued together. This determination is performed by assigning functional units to independent instructions until all available functional units are assigned. Functional unit check circuit 505 provides a plurality of functional unit indication signals as outputs based upon the analysis of the instruction functional unit information. These functional unit indication signals are provided to AND circuit 509.

Register independence circuit 506 analyzes the register locations provided by op code circuit 504 to determine whether there are any register dependent operations within the instruction set. This determination is done by comparing register numbers of destination registers of one instruction with all the registers of another instruction. Independence is not an associative operation, thus all instructions that are compared must be compared with each other. Register independence circuit 506 provides a plurality of register independence signals as outputs based upon the analysis of the register location information. These register independence signals are provided to AND circuit 509.

AND circuit 509 provides the AND of a functional unit indication signal and a respective register independence signal as an input to encoder 508. Encoder circuit provides a grouping signal as an output as well as providing a shift signal to shift instruction unit 502. The shift signal indicates to shift instruction unit 502 by how much to shift the instruction set before performing a subsequent grouping determination.

OTHER EMBODIMENTS

Other embodiments are within the following claims.

For example the grouper circuit may be provided in a variety of configurations. More specifically, an efficient grouper circuit can be provided by providing the number of a group to the shift operation after determining that an independent instruction is the next instruction in a group to remove the selected instruction and bring in new instructions. Also, some grouping code may be assigned to each instruction in the group. For example, the first instruction in the group can be marked by a zero and the rest of the instructions in the group can be marked by ones. I.e., a zero indicates the starting instruction and a one indicates a continuation of the group.

Figure 6:
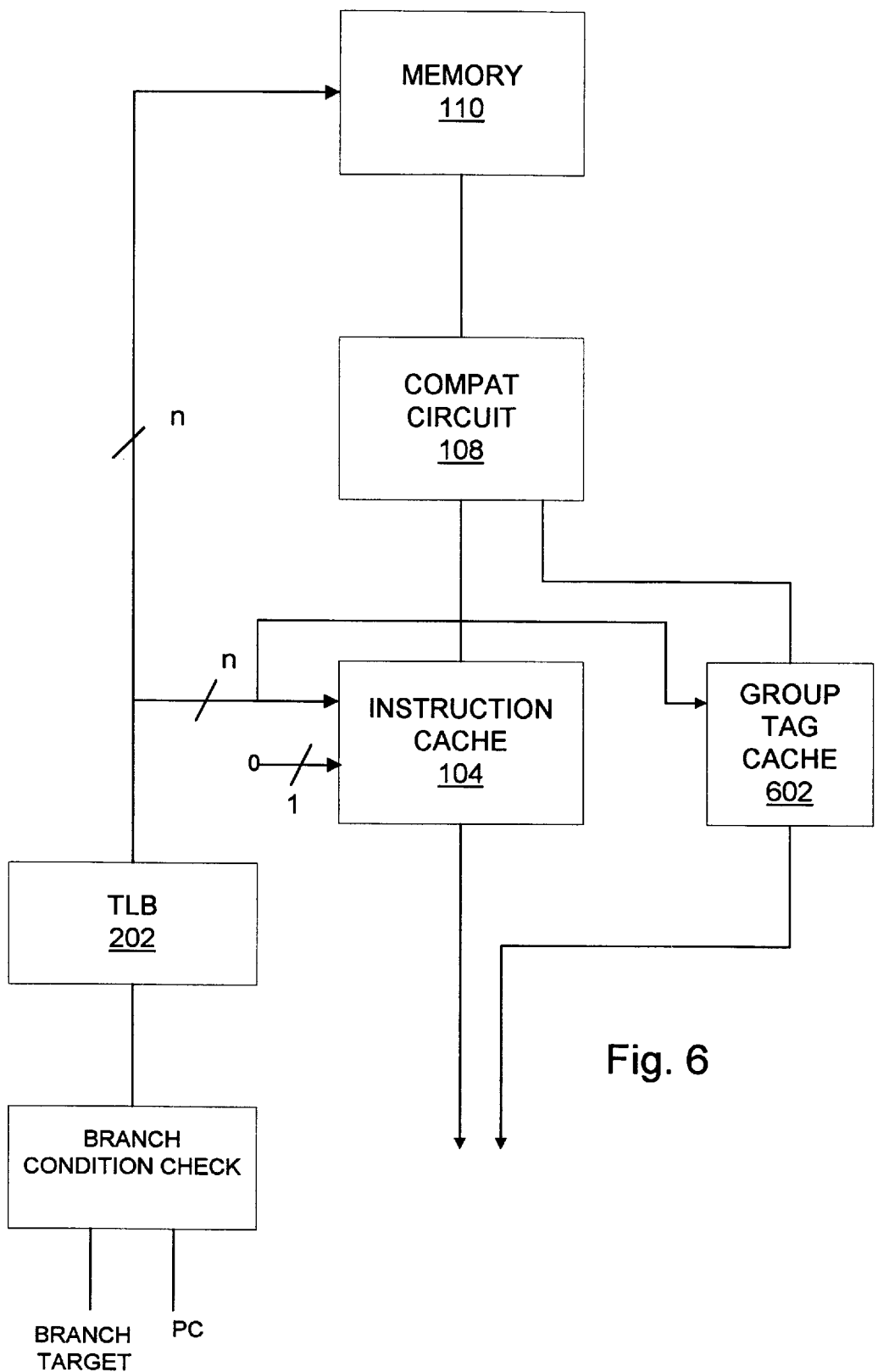
FIG. 6 shows a schematic block diagram of an alternate compatibility circuit.

Also for example, referring to FIG. 6, compatibility circuit 108 may be used in a system which maps from a machine to itself This approach is desirable for example, when the grouping logic that determines the intra-group relationships is moved out of the execution pipeline and the grouping is performed between memory 110 and instruction cache 104. Such a system converts a dynamically grouped machine to a staticly grouped machine. The grouping is not done by the compiler so that the instruction set architecture and application binaries are not changed. Thus, the mapping is from 32-bit instructions to 32-bit instructions. There is no need to increase the new machine instructions to 64-bits to accommodate the grouping information. The information may be transferred and held within a grouping cache 602.

Accordingly the addressing does not change and the group bits are saved in a cache with the same structure and number of lines as the instruction cache. However, the cache lines of the grouping cache 602 need only have one bit per word of the instruction cache line. The same address that is sent to the instruction cache 104 is sent to the grouping cache 602 for addressing the grouping cache. When accessed, group tag bits may be merged with the instructions or routed separately to be used for issue.

What is claimed is:

1. A system for executing a first instruction set corresponding to a first machine architecture on a processor executing a second instruction set corresponding to a second machine architecture, the system comprising:

a memory storing instructions corresponding to the first instruction set;

a compatibility circuit, the compatability circuit mapping the instructions corresponding to the first instruction set to respective instructions corresponding to the second instruction set; and a processor, the processor including an instruction cache, a data cache and a processing portion, the instruction corresponding to the second instruction set being loaded into the instruction cache on a line by line basis.

2. The system of claim 1 wherein the compatibility circuit is a mapper circuit.

3. The system of claim 2 wherein the mapper circuit includes a plurality of field translation circuits, the plurality of field translation circuits receiving the instruction conforming to the first instruction set and mapping fields of the instruction to fields corresponding to the second instruction set.

4. The system of claim 3 wherein the mapper circuit includes an operation decode circuit, the operation decode circuit receiving an op code field of the instruction corresponding to the first instruction set and controlling the field translation circuits to map the instruction based upon the op code field of the instruction corresponding to the first instruction set.

5. The system of claim 1 further comprising:

an addressing circuit coupled to the compatibility circuit and the instruction cache, the addressing circuit manipulating an instruction address of the instruction corresponding to the first instruction set to allow a manipulated address to address the address conforming to the second instruction set.

6. The system of claim 5 wherein instructions conforming to the first instruction set have a first instruction set width;

instructions conforming to the second instruction set have a second instruction set width; and the manipulating is a shift operation so as to account for a difference between the first instruction set width and the second instruction set width.

7. The system of claim 6 wherein the shift operation adds a zero as a least significant bit of the manipulated address.

8. The system of claim 1 wherein the first instruction set is a subset of the second instruction set.

9. A system for executing a first instruction set corresponding to a first machine architecture on a processor executing a second instruction set corresponding to a second machine architecture, the system comprising:

a memory storing instructions corresponding to the first instruction set;

a compatibility circuit, the compatibility circuit mapping the instructions corresponding to the first instruction set to respective instructions corresponding to the second instruction set, the compatibility circuit including:

a grouper circuit, the grouper circuit grouping instructions that execute concurrently, the grouper circuit providing the instructions with a grouping indication; and a processor, the processor including an instruction cache, a data cache and a processing portion, the instruction corresponding to the second instruction set being loaded into the instruction cache on a cache-line by cache-line basis.

10. The system of claim 9 wherein the compatibility circuit includes a mapper circuit.

11. The system of claim 10 wherein the mapper circuit includes a plurality of field translation circuits, the plurality of field translation circuits receiving the instruction conforming to the first instruction set and mapping fields of the instruction to fields corresponding to the second instruction set.

12. The system of claim 11 wherein the mapper circuit includes an operation decode circuit, the operation decode circuit receiving an op code field of the instruction corresponding to the first instruction set and controlling the field translation circuits to map the instruction based upon the op code field of the instruction corresponding to the first instruction set.

13. The system of claim 9 further comprising:

an addressing circuit coupled to the compatibility circuit and the instruction cache, the addressing circuit manipulating an instruction address of the instruction corresponding to the first instruction set so as to allow a manipulated address to address the address conforming to the second instruction set.

14. The system of claim 13 wherein instructions conforming to the first instruction set have a first instruction set width;

instructions conforming to the second instruction set have a second instruction set width; and the manipulating is a shift operation so as to account for a difference between the first instruction set width and the second instruction set width.

15. The system of claim 14 wherein the shift operation adds a zero as a least significant bit of the manipulated address.

16. The system of claim 9 wherein the first instruction set is a subset of the second instruction set.

17. A method of operating a processor including an instruction cache, a data cache and a processing portion, the processor for executing a first instruction set corresponding to a first machine architecture and for executing a second instruction set corresponding to a second machine architecture, the method comprising:

storing instructions corresponding to the first instruction set;

mapping the instructions corresponding to the first instruction set to respective instructions corresponding to the second instruction set; and loading the second instruction into the instruction cache on a cache-line by cache-line basis.

18. A method according to claim 17 further comprising:

grouping instructions that execute concurrently; and tagging the instructions with a grouping indication.

19. A method according to claim 17 further comprising:

receiving an instruction conforming to the first instruction set and mapping fields of the instruction to fields corresponding to the second instruction set.

20. A method according to claim 17 further comprising:

receiving an op code field of the instruction corresponding to the first instruction set and controlling a plurality of field translation circuits to map the instruction based upon the op code field of the instruction corresponding to the first instruction set.

21. A method according to claim 17 further comprising:

manipulating an instruction address of the instruction corresponding to the first instruction set to allow a manipulated address to address the address conforming to the second instruction set.

* * * * *